July 5, 1966    R. A. GRAY ETAL    3,259,315
MODULATING PNEUMATIC THERMOSTAT
Filed June 6, 1963    8 Sheets-Sheet 1
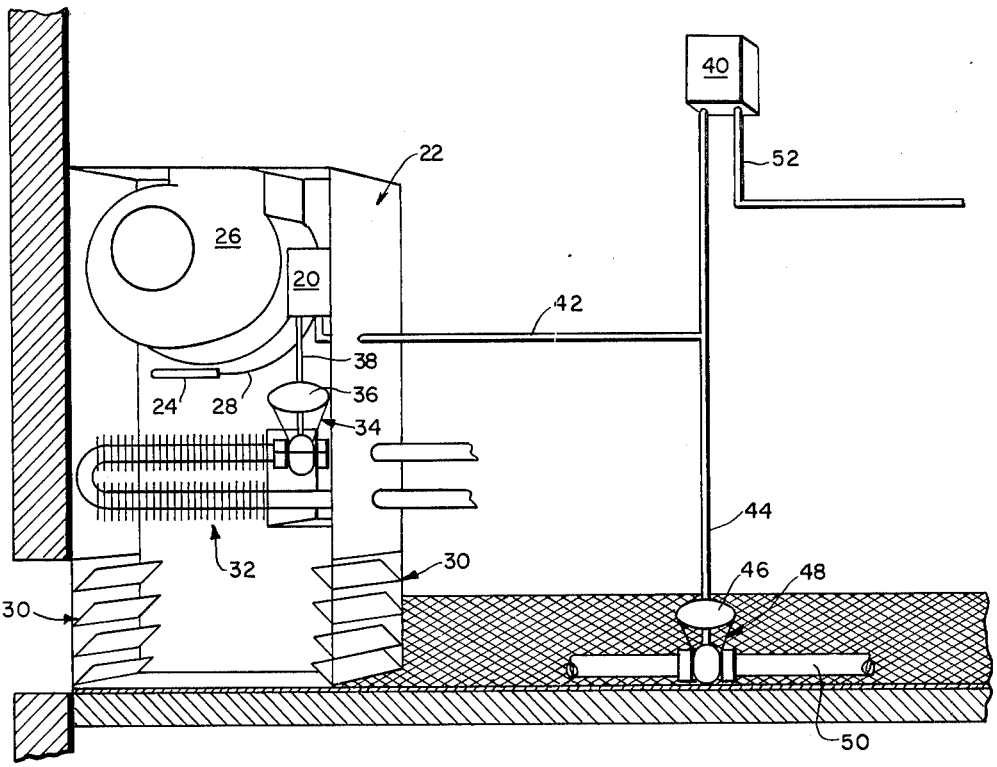
FIG.1.
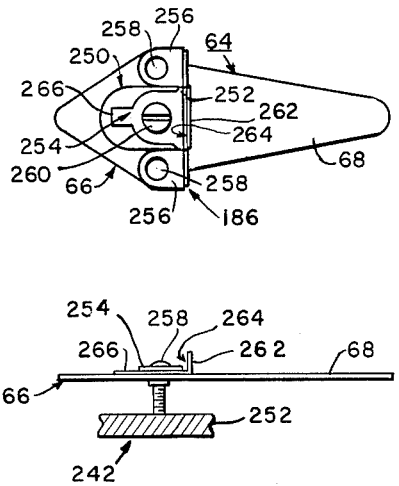
FIG.18.
FIG.19.
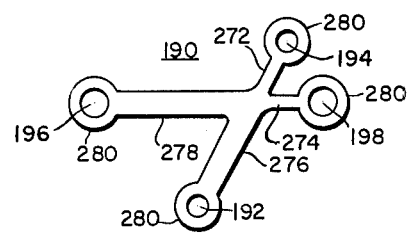
FIG.20.
INVENTORS
Robert A. Gray &
Arthur L. Good
BY
Herbert M. Birch
ATTORNEY

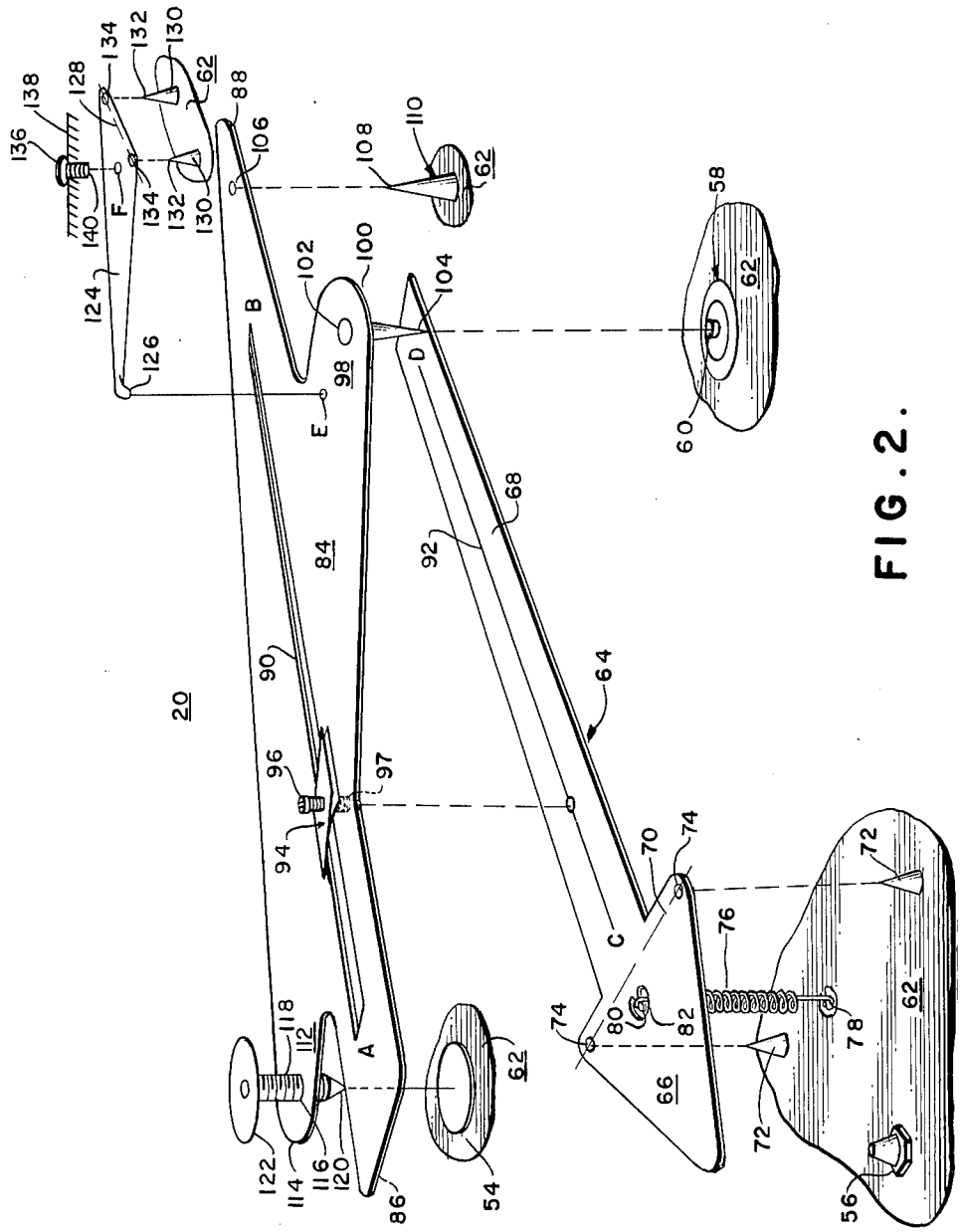

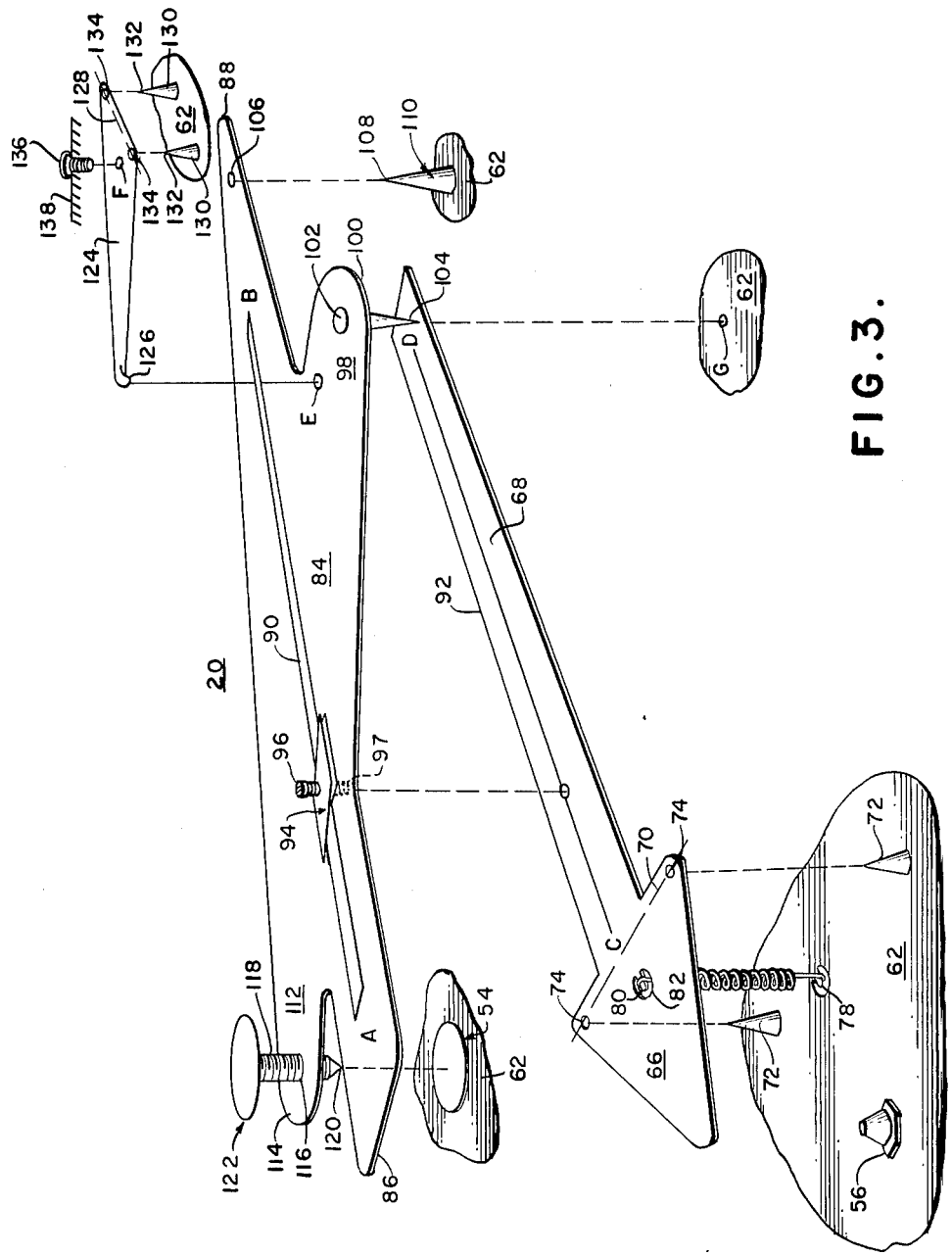

INVENTOR.
Robert A. Gray &
Arthur L. Good
BY
ATTORNEY

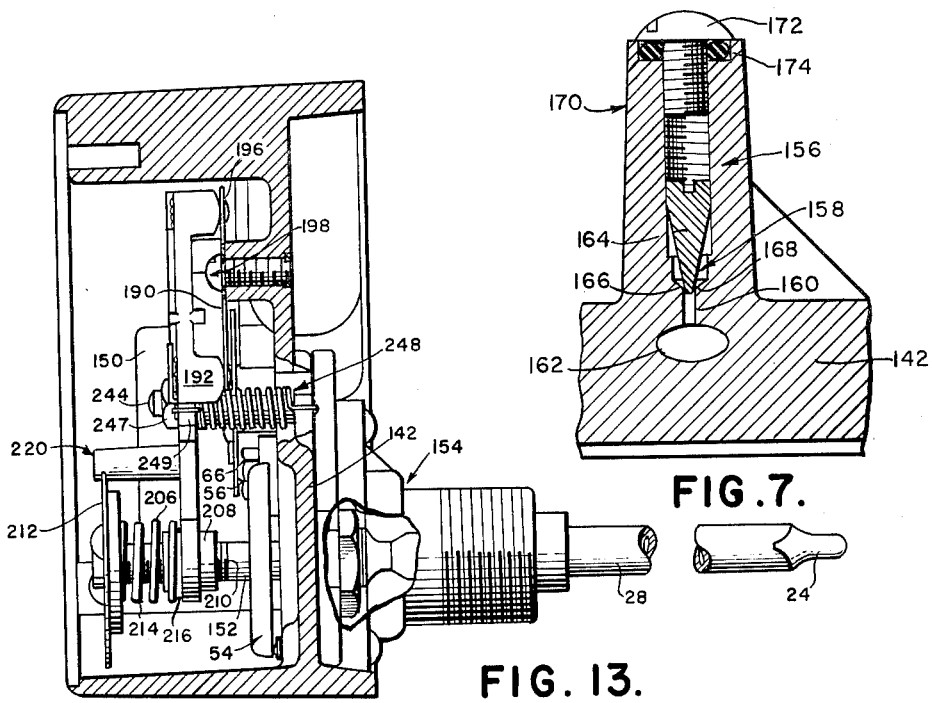
FIG. 7.
FIG. 13.
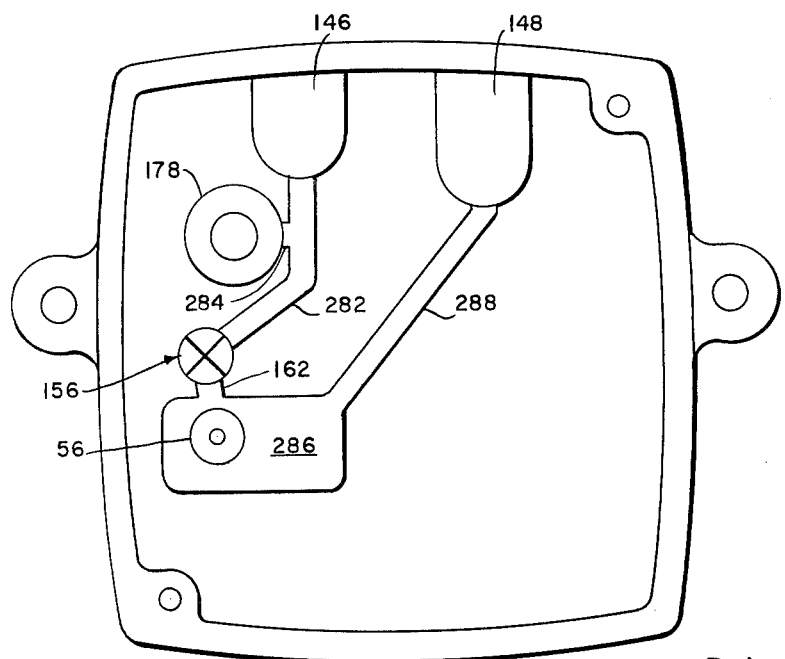
FIG. 21.
INVENTORS
Robert A. Gray &
Arthur L. Good
ATTORNEY INVENTORS
Robert A. Gray &
BY    Arthur L. Good

ATTORNEY

July 5, 1966  R. A. GRAY ETAL  3,259,315
MODULATING PNEUMATIC THERMOSTAT
Filed June 6, 1963  8 Sheets-Sheet 7

INVENTOR.
Robert A. Gray &
BY  Arthur L. Good

ATTORNEY

July 5, 1966  R. A. GRAY ETAL  3,259,315
MODULATING PNEUMATIC THERMOSTAT
Filed June 6, 1963  8 Sheets-Sheet 8
FIG. 14.
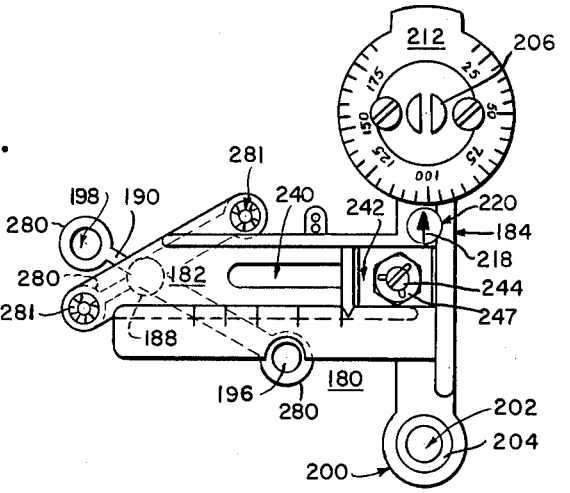
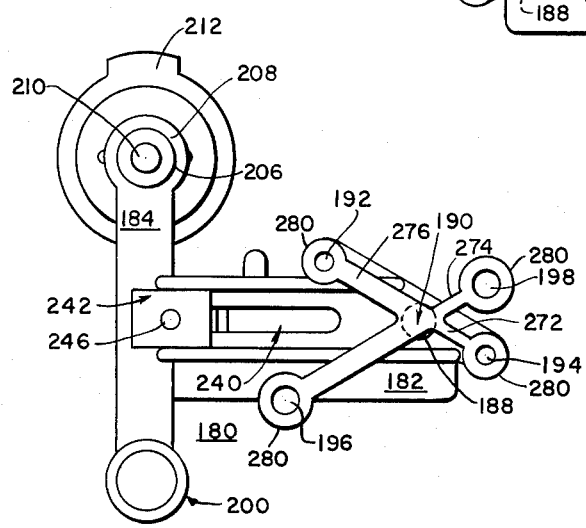
FIG. 15.
FIG. 16.
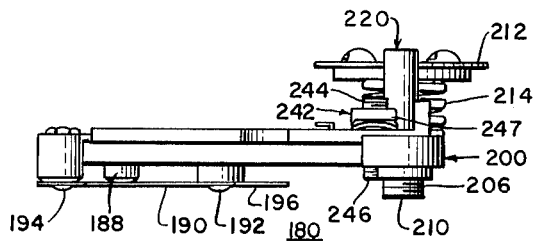
FIG. 17.
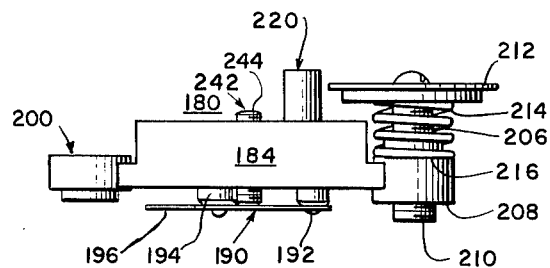
INVENTORS
Robert A. Gray &
Arthur L. Good
BY
ATTORNEY United States Patent Office 3,259,315
Patented July 5, 1966

1

3,259,315
MODULATING PNEUMATIC THERMOSTAT
Robert A. Gray, Goshen, and Arthur L. Good, Elkhart, Ind., assignors to Robertshaw-Fulton Controls Company, Richmond, Va., a corporation of Delaware
Filed June 6, 1963, Ser. No. 285,964
19 Claims. (Cl. 236—37)

This invention relates to pneumatic thermostats and more particularly, to pneumatic thermostats of the low limit, modulating type.

It is an object of this invention to provide a pneumatic, low limit, modulating thermostat which is adapted for operation with or without submaster modulation.

It is another object of this invention to provide a pneumatic, low limit, modulating thermostat of the pneumatic bleed type employing a novel control linkage and leakport arrangement.

Another object of this invention is to provide a pneumatic, low limit, modulating thermostat of the pneumatic bleed type employing a novel control linkage and leakport arrangement and including a novel universal flexure hinge means for mounting a portion of the said control linkage, whereby the effect of friction in the said thermostat is greatly reduced.

Still another object of this invention is to provide a pneumatic, low limit, modulating thermostat having a novel selectively adjustable flow restrictor therein between the input and output pressure connections thereof.

These and other objects of this invention will become more apparent with reference to the following specification and drawings which relate to several preferred embodiments of the present invention.

In the drawings:

FIGURE 1 is a schematic example of a system incorporating the present invention;

FIGURE 2 is an exploded schematic of one embodiment of the invention;

FIGURE 3 is an exploded schematic of another embodiment of the invention similar to that shown in FIGURE 2;

FIGURE 7 is an enlarged cross-section taken along line 7—7 of FIGURE 4;

FIGURE 13 is a cross-section taken along line 13—13 of FIGURE 10;

FIGURE 14 is a top plan view of a detail common to the embodiment of FIGURES 4 and 10;

FIGURE 15 is a bottom plan view of the detail of FIGURE 14;

FIGURE 16 is a side elevation of the detail of FIGURE 14;

2

Figure 4:
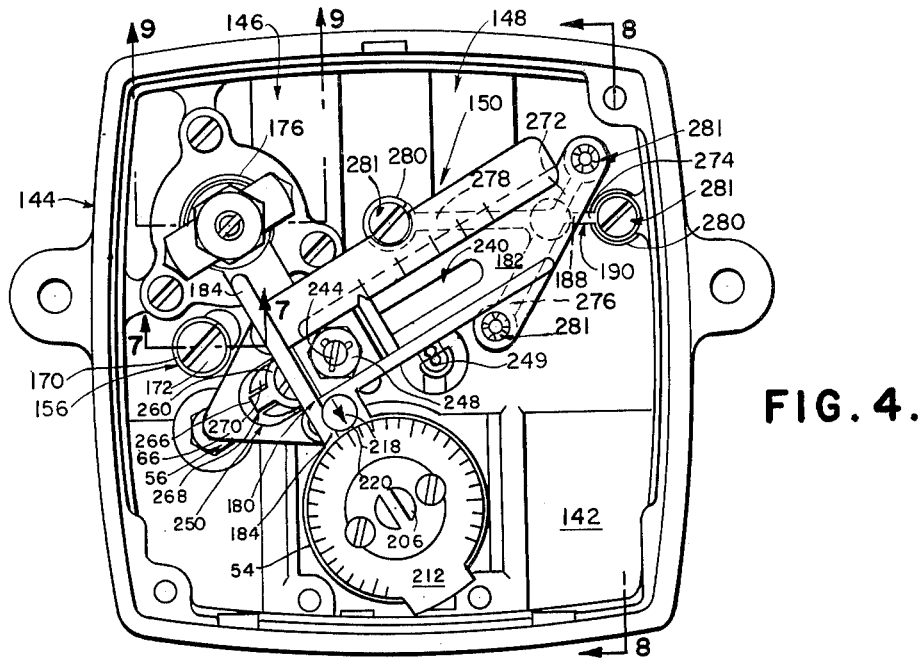
FIGURE 4 is a top plan view of a third embodiment of the invention.
Figure 10:
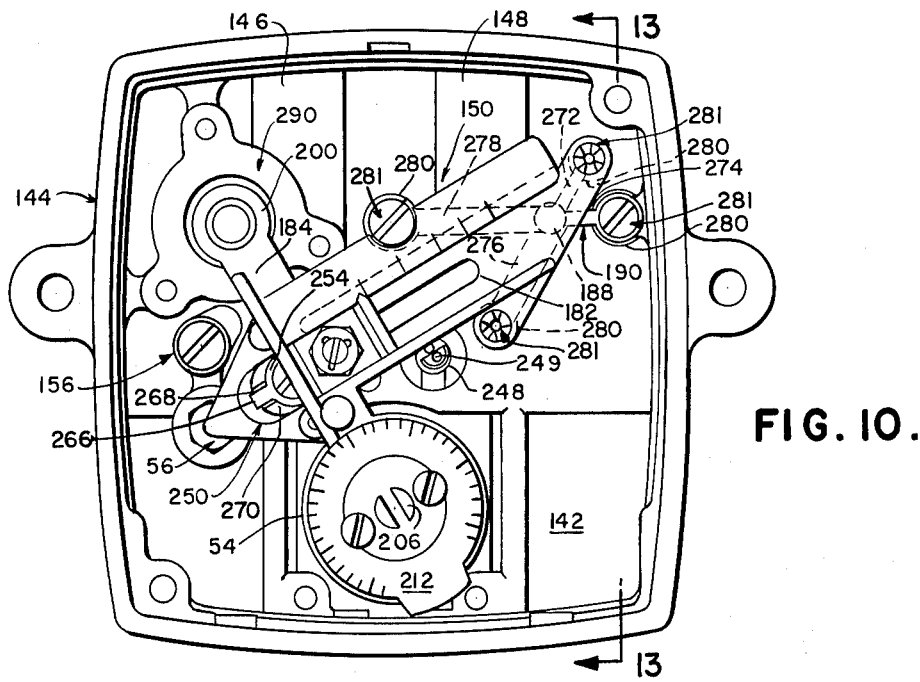
FIGURE 10 is a top plan view of a fourth embodiment of the invention.

FIGURE 17 is an end view of the detail of FIGURE 14;

FIGURE 18 is a top plan view of a detail common to the embodiments of FIGURES 4 and 10;

FIGURE 19 is a side elevation of the detail of FIGURE 18;

FIGURE 20 is a top plan view of another detail common to the embodiments of FIGURES 4 and 10; and FIGURE 21 is a top plan view in partial detail for the purpose of indicating the flow patterns within the structure of the invention.

Referring in detail to the drawings and more particularly to FIGURE 1, the modulating, low limit, pneumatic thermostat 20 of the subject invention is shown mounted within a unit ventilator or space heater 22.

A thermostat bulb 24 is positioned in the inlet airstream of a blower 26 and connected by a rigid hollow stem 28 to the thermostat 20 to comprise the condition responsive element thereof.

The unit ventilator includes louvered inlets 30 upstream from the blower 26 and a finned hot water circulating coil or heat exchange labyrinth 32 intermediate the said inlets 30 and the blower 26.

A pneumatically actuated hot water control valve 34 includes an actuating pressure chamber 36 connected with the outlet or branch pressure line 38 from the pneumatic, low limit, modulating thermostat 20 which modulates the branch pressure to control the flow of hot water in the labyrinth 32.

The input pressure for the low limit thermostat 20 is derived from a remote pneumatic wall thermostat 40 and is transmitted therefrom to the low limit thermostat 20 via a pressure input line 42. The input line 42 includes a branch 44, which corresponds as a branch pressure line for the wall thermostat 40 and leads to an actuating pressure chamber 46 in a main hot water control valve 48 in a hot water main 50 connected with labyrinth 32 to supply hot water thereto.

The input or main pneumatic pressure for the wall thermostat 40 is brought in via an input line 52 from a pneumatic pressure source not shown.

Referring now to FIGURE 2, one embodiment of the control linkage of the low limit thermostat 20 will now be described.

A Diastat diaphragm 54, a leakport 56 and a submaster diaphragm 58, the latter including an integral actuating button 60, are all mounted on a common base plate 62 schematically indicated by the shaded areas in FIGURE 2.

A spear-shaped leakport lever 64, having a triangular head portion 66 and an elongated shank portion 68 is pivotally mounted above the base plate 62 along a transverse axis 70 at the back of the head portion 66 thereof such that the under surface of the said head portion 66 adjacent the endmost apex thereof will engage and close the leakport 56. The pivot means for the said axis 70 comprises a pair of conical pins 72 fixed to the base plate 62 and a corresponding pair of socket holes 74 in the head portion adjacent the lateral apices thereof which loosely receive the said pins 72 to permit a pivotal action of the leakport lever 64 thereon.

The leakport lever 64 is biased to close the leakport 56 by means of a tension spring 76 fixed at one end to an integral tang 78 on the base plate 62 and at the other to an integral tang 80 extending diametrically of a port 82 in the head portion 66 of the leakport lever 64 at a position intermediate the pivotal axis 70 and the leakport 56.

Immediately above the leakport lever 64 and coextensive with the shank 68 thereof is an irregular cruciform transmitter lever 84 having a free end 86 adjacent the head portion 66 of the leakport lever 64 and the remaining ends thereof pivotally mounted to provide a three point suspension of the said transmitter lever 84.

The free end 86 of the transmitter lever 84 and the longitudinally opposite pivotally mounted end 88 thereof form the longitudinal portion of the said transmitter lever 84 which is coextensive with the shank 68 of the leakport lever 64.

A longitudinally disposed throttling range slot 90, extending between the points A and B on the surface of the transmitter lever 84, is provided which is coextensive with that portion of the longitudinal axis 92 of the leakport lever 64 between the points C and D on the surface of the shank portion 68 thereof.

A throttling range adjustment is provided in the form of a throttling range slide mounted in the slot 90. An adjustable stop screw 96 is provided in the slide 94 and extends through the slot 90 such that the lower end or foot 97 thereof contacts the leakport lever 64 along the longitudinal axis 92 thereof.

A first lateral extension 98 of the transmitter lever 84 is provided with an outer end 100 located above the submaster diaphragm 58. An integral tapered pin 102 extends vertically downward from the end 100 of the lateral extension 98 and has a lower bearing point 104 in contact with the submaster diaphragm button 60, whereby one of the points of suspension of the transmitter lever is provided.

The end 88 of the longitudinal section of the transmitter lever 84, adjacent the end B of the range slot 90, is provided with a socket or port 106 which receives the tapered upper tip 108 of a pin 110 fixed at its other end to the base plate 62 to thereby provide another of the three points of suspension of the said transmitter lever 84.

A second lateral extension 112 of the transmitter lever 84 is provided with an outer end 114 located above the Diastat diaphragm 54. A tapped port 116 is provided adjacent the said outer end 114. A condition responsive input in the form of a displacement imparted to the said second lateral extension 112 is effected via a set point screw 118 vertically and adjustably received in the tapped port 116, having the lower end 120 thereof in engagement with the Diastat diaphragm 54. A set point dial 122 is mounted on the upper end of the set screw 118.

The control linkage assembly is completed by means of a flexure spring 124 which is shown as being triangular in shape with a foot 126 at one apex thereof adapted to contact the upper surface of the first lateral extension 98 at a point E. The flexure spring 124 is pivotally mounted on an axis 128 extending between its two remaining apices by means of a pair of tapered pins 130 having their upper tips 132 engaged in a pair of sockets 134 located one adjacent each of the said remaining apices of the flexure spring 124. The pins 130 are fixedly mounted on the base plate 62.

The bias effect of the flexure spring 124 is made selectively adjustable by means of an adjusting screw 136 which is threadably mounted in a fixed bracket 138 or the like above the spring 124 whereby the foot 140 of the screw can be made to bear against a point F on the upper surface of the flexure spring 124.

Referring now to FIGURE 3, this embodiment is identical in every respect with that of FIGURE 2 with the exception that there is no submaster diaphragm. This has been replaced by a fixed point G on the surface of the mounting plate 62. The lower tip 104 on the pin 102 in the outer tip 100 of the first lateral extension 98 is thus made equivalent to a fixed pivot or constant input as far as vertical displacement of the transmitter lever 84 is concerned. All other parts are identical to those of the embodiment of FIGURE 2 and bear like numerals.

A third embodiment of the thermostat of the present invention will now be described with joint reference to FIGURES 4 through 9.

Figure 5:
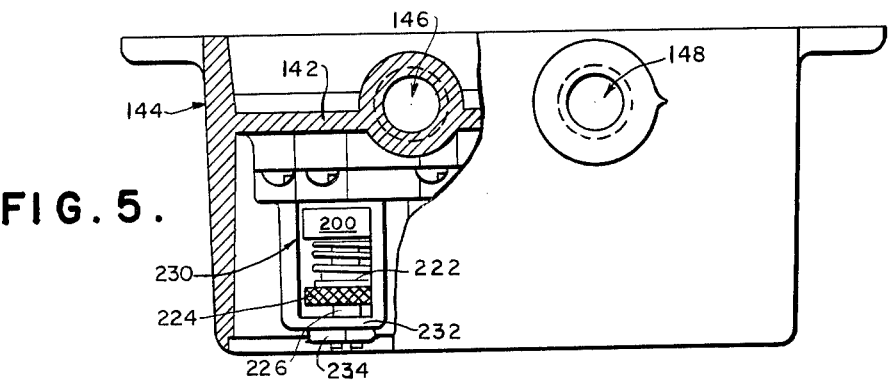
FIGURE 5 is an inverted end view of FIGURE 4 in partial cross-section.

The mounting plate 142 is an integral web portion of a molded outer casing 144 and, as shown in FIGURE 5, includes a signal or input pressure connection 146 and a branch or output pressure connection 148.

The condition responsive element which supplies a variable displacement input to the control linkage assembly 150, to be hereinafter more fully described, comprises a charged bulb Diastat, which as illustrated schematically in FIGURE 1 and further illustrated in FIGURE 13, has a remote bulb 24 and a hollow connecting tube 28 which are coupled to a diaphragm assembly 54, as referenced in FIGURES 2 and 3, mounted on the base plate 142, the said diaphragm assembly including a pressure plate or button 152, see FIGURE 13. The mounting connection for the Diastat diaphragm 54 comprises a suitable through-coupling, generally indicated at 154, in the mounting plate 142, which holds the diaphragm assembly 54 adjacent the inner surface of the mounting plate 142.

Since its structure is substantially equivalent for all embodiments of the invention, the leakport lever 64 is still designated with the same detail numerals such as the head portion 66 and shank 68, with the exception of several additional details to be hereinafter described in conjunction with FIGURES 18 and 19 and the detailed description of a T-shaped transmitter lever 180, generally designated 84 in the first two schematic embodiments in FIGURES 2 and 3.

Also, the leakport 56 bears the same numeral throughout the specification. The leakport 56 in the present embodiment is mounted on the inner surface of the base plate 142 and communicates with a branch pressure chamber, to be hereinafter described with reference to FIGURE 21, which is directly ported to the output or branch pressure connection 148. Also to be herinafter more fully described with reference to FIGURE 21 and as shown in FIGURE 7, a needle valve or variable flow restriction 156 is provided which, via a transfer port 158, couples the pressure signal input 146 to the branch pressure chamber via a restricted port 160 and branch pressure chamber input port 162 within the base plate 142.

The needle valve is provided with a threaded, conical-tipped, valve needle 164 which protrudes a preselected distance into a substantially conical flow restriction 166 having a substantially vertical notch 168 cut in the lower peripheral surface thereof. This permits proper response rate control of the pneumatic thermostat with the advantage that the notch 168 makes the needle valve 156 substantially free from a tendency to clog, dust particles and other solid air pollution being readily passed through the restriction 166 by virtue of the notch 168.

The needle valve 156 is housed in an internally threaded, upstanding, tubular, integral stem 170 on the base plate 142. A capping screw 172 cooperating with an O-ring seat 174 at the upper end of the stem 170 completes a closed dust-free and leak-proof housing for the needle valve 156.

A submaster diaphragm assembly 176 is provided which comprises one wall of an input pressure chamber 178 in the base plate 142. The input pressure chamber 178 is in direct communication with the signal pressure input port 146.

The relative position of the Diastat diaphragm 54 and the submaster diaphragm 176, as shown in FIGURE 4, is such that they are symmetrically spaced one on either side of the leakport 56.

Figure 6:
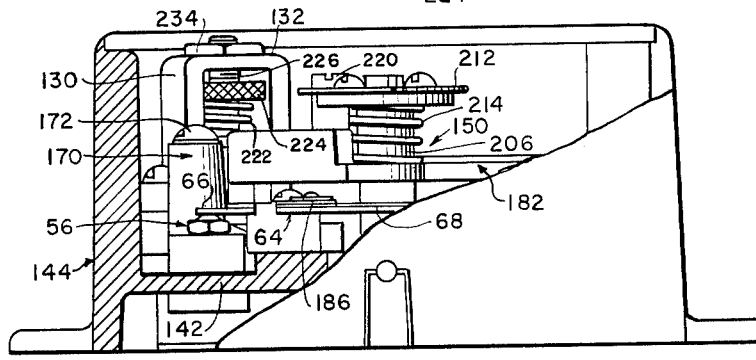
FIGURE 6 is an end view of FIGURE 4, in partial cross-section, opposite to the end view of FIGURE 5.

The control linkage 150 of the third embodiment is generally shown in FIGURE 4, with additional reference to FIGURES 14, 15, 16 and 17, as comprising a T-shaped transmitter lever 180 having a shank portion 182 and a cross-member 184, the said shank portion 182 being vertically displaced from and coextensive with the shank portion 68 of the leakport lever 64. The leakport lever 64 is pivoted on pivot means 186, as shown in FIGURES 6 and 18 and to be hereinafter more fully described with reference to FIGURES 18 and 19, mounted on the base plate 142 such that the under surface adjacent the outer apex of the head portion 66 of the said leakport lever 64 will engage the leakport 56.

The outer tip of the transmitter lever 180 of the third embodiment, schematically referenced 84 in FIGURES 2 and 3, includes the shank 182 from the cross-member 184 and includes a dependent pivot stud 188. This stud 188 is engaged with the mid-portion of a universal flexure hinge means 190, as illustrated in the afore referenced FIGURES 14, 15, 16 and 17. This hinge which is a flat X-shaped flexible member is more fully described hereinafter with reference to FIGURE 20 in column 6.

This flexure hinge 190 has first and second fixed points 192 and 194, respectively, secured on the shank 182 and third and fourth points 196 and 198 suitably secured to the base plate 142, see FIGURES 4, 14 and 15. This arrangement positions the flat surface of the said hinge means at the intersection of the straight lines between the said fixed points 192 and 194 and the points 196 and 198 on the base plate 142, so as to be in engagement with the pivot stud 188, see FIGURE 16, of the lever shank 182 on one side and adjacent to the base plate 142 on the other side in the provision of a first point of suspension for the transmitter lever 182.

Figure 9:
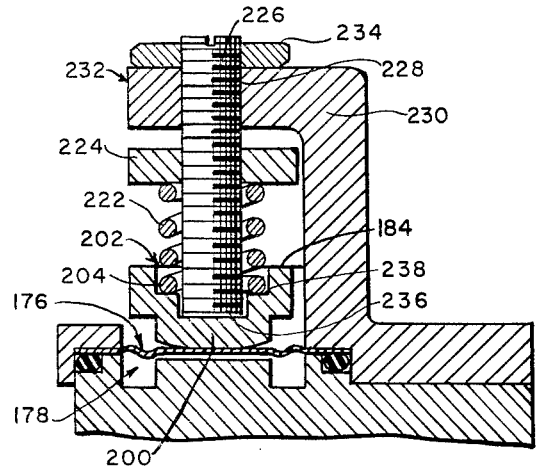
FIGURE 9 is a cross-section taken along line 9—9 of FIGURE 4.

As specifically shown in cross-section in FIGURE 9 the second point of transmitter suspension is provided by a diaphragm engaging foot member 200 having a stepped inner socket portion 202 forming a spring seat 204 therein is provided as an integral portion of one end of the transmitter lever cross-member 184. The lower surface of the foot 200 is in engagement with the submaster diaphragm 176, whereby the said second point of suspension is provided for the transmitter lever 180, through which the input variable representative of the submaster control, if used, may function is applied to the said transmitter lever 180. However, when submaster control is not desired, this foot 200 may be only engaged as a reference point on the base plate 142.

Figure 8:
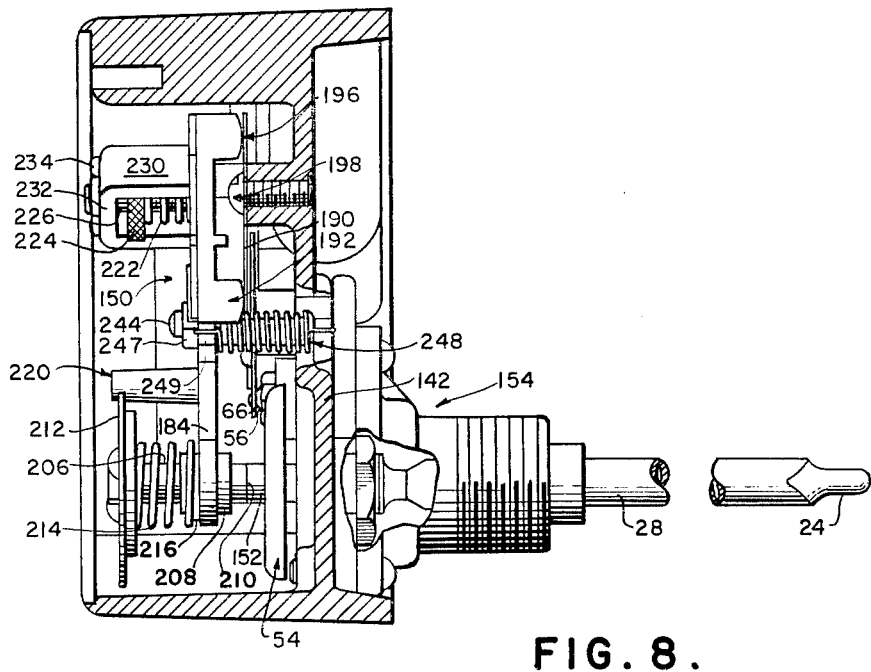
FIGURE 8 is a cross-section taken along line 8—8 of FIGURE 4.

The third and final point of suspension is provided via the set-point screw 206, see FIGURE 8, adjustably threaded in the tapped port 208 in the opposite end of the cross-member 184, the lower end 210 of the said set-point screw 206 being in engagement with the diaphragm button 152 on the Diastat diaphragm 54. A sub-point dial 212 is fixedly mounted on the upper end of the set-point screw. A coiled compression spring 214 is provided concentric with the set-point screw 206 between the set-point dial 212 and a spring seat 216 circumferentially disposed with respect to the tapped port 208 on the upper surface of the cross-member 184.

The set-point dial 212 is calibrated with reference to a fixed index mark 218 on an integral upstanding post 220 on the upper surface of the cross-member 184.

Referring back to the submaster portion of the control linkage 150, biasing means for the submaster input variable, as shown in FIGURE 9, is provided in the form of a coiled, compression type range spring 222 seated at its lower end on the spring seat 204 of the foot member 200 and seated at its upper end against the bottom of an adjustable range nut 224. The range nut is threadably received on a vertical stop-screw 226 which is mounted so as to be vertically adjustable in a tapped bore 228 of a fixed bracket 230, integral with the base plate 142 and having a portion 232 overhanging the submaster diaphragm 176, the tapped bore 228 being in the said portion 232.

The stop screw 228 extends downwardly, internally concentric with the range spring 222 and into the center of the stepped socket 202 in the foot 200 of the cross-member 184. A lock nut 234 is provided on the stop screw 228 to engage the upper surface of the overhanging portion 232 of the bracket 230. The upper limit of the movement of the foot 200 via the submaster diaphragm 176 can now be set by positioning the lower-tip 236 of the stop screw 228 relative the bottom inner surface 238 of the stepped socket 202 in the foot 200.

The transmitter lever 180, see FIGURES 14, 15 and 16, is selectively coordinated with the leakport lever 64 by means of a calibrated range slot 240, see FIGURE 1, extending along an intermediate portion of the central longitudinal axis of the shank portion 182 and an adjustable range slide 242 mounted in the said slot 240. The transmitter lever 180 is positioned such that the said range slot 240 is coextensive with a portion of the central longitudinal axis of the shank portion 68 of the leakport lever 64.

A stop screw 244 is adjustably mounted in and vertically extended from the range slide 242, the lower tip 246 of the said screw 244 being in engagement with the upper surface of the shank portion 68 of the leakport 64 along the central longitudinally axis thereof. A suitable lock nut 247 is provided to lock the stop screw 244 to the range slide 242. A similar arrangement is hereinbefore described with respect to the embodiments of FIGURES 2 and 3.

Referring to FIGURES 4 and 8, a positive interaction between the transmitter lever 180 and the leakport lever 64 is further assured by means of a tension spring 248 connected from a lateral appendage 249 on the said transmitter lever 180 to a suitable hold-down integral with the base plate 142, see FIGURES 8 and 13.

Referring now to FIGURES 18 and 19, an actual physical embodiment of the leakport lever 64 is shown in detail with like parts to the levers schematically shown in FIGURES 2 and 3 bearing like numerals, namely, the head portion 66 and shank portion 68 thereof.

An oval slot 250 is longitudinally and centrally located in the head portion 66 of the leakport lever 64. A substantially E-shaped resilient spring plate 252, see FIGURE 18, having its central tine 254 extending out over the slot 250 is placed on the leakport lever 64 and then riveted to the said lever 64 by means of its outer tines via a pair of oblong hold-down washers 256 and a pair of hollow tubular rivets 258.

The central tine 254 of the E-shaped plate 252 includes a bore through which a bias adjusting screw 260 extends into threaded engagement with the base plate 142, as shown in FIGURE 19, whereby the spring force of the central tine 254, tending to maintain the head portion 66 of the leakport lever 64 against the leakport, may be selectively varied.

The E-shaped plate 252 is provided with a vertical shoulder 263 along its straight edge portion whereby a substantially right angle intercept 264 is provided between the central tine 254 and the vertical shoulder 262, 263. The intercept 264 actually comprises a flexure hinge axis for the leakport lever 64 and will hereinafter be referred to as the flexure hinge axis 264.

As shown in FIGURES 4, 10 and 18, the central tine 254 has an end extension 266 thereon which is adapted to be received in the slot portion 268 of a vertical bifurcated pin 270 integral with the base plate 142, whereby lateral end play of the leakport lever 64 is prevented. This bifurcated pin 270 has each spaced branch thereof contoured to mate with the projection 266 and the peripheral contour of the tine 254.

Referring now to FIGURE 20, the universal hinge means 190 is shown as being a flat X-shaped spring means having a pair of adjacent short legs 272 and 274 which extend past the intersection of the X-shape into a pair of longer but unequal length leg portions 276 and 278, respectively which has flexure hinge members for the transmitter lever 180. The outer tip of each of the said leg portions includes a planar, integral eyelet 280, each of which, as also shown in FIGURES 14 and 15, includes one of the points 192, 194, 196 and 198 on the ends of the leg portions 276, 272, 278 and 274, respectively, where screws, rivets, or the like 281 are used to fix eyelets 280 of the legs 274 and 278 to the base plate 142 and the eyelets 280 on the remaining legs to the transmitter lever shank 182 at each of the said points as shown in FIGURE 4.

A universal flexure hinge action is provided by the spring hinge 190 which, for example, is found to be satisfactory when the acute angle subtended by adjacent arm portions thereof is equal to sixty (60) degrees.

Referring now to FIGURE 21, the fluid porting scheme of the present invention is shown as comprising the inlet or signal pressure passage 146 extending to one side of the needle valve 156 via a first transfer port 282 and directly connected to the submaster diaphragm chamber 178 by a second transfer port 284.

The outlet port 162 for the needle valve 156 connects with a branch pressure chamber 286 which is exhausted to atmosphere by the leakport 56 at a variable rate to effect a control of the branch pressure therein.

The branch pressure chamber 286 is coupled with the branch pressure or outlet passage 148 by a suitable transfer port 288.

In the embodiments where neither the submaster diaphragm 176 or its pressure chamber 178 are provided, the said second transfer port 284 is also either eliminated or rendered ineffective.

The embodiment of FIGURES 10, 11, 12 and 13 is identical to that of FIGURES 4, 5, 6, 7, 8 and 9 with the exception that the submaster diaphragm, range screw and spring assembly of the latter has been removed and replaced by a rigid plate or seat 290 against which the foot 200 on the cross-member 184 of the transmitter lever 180 is adapted to abut.

The remaining parts in FIGURES 10, 11, 12 and 13 are identical with and bear identical numerals with their counterparts in FIGURES 4, 5, 6, 7, 8 and 9.

Operation

Referring first to FIGURES 1, 2 and 3 the operation of these embodiments will now be described.

The throttling range of the thermostat 20 is preselected by positioning the range slide 94 in the range slot 90 on the transmitter lever 84, thus determining the response of the leakport lever 64 to the motions of the transmitter lever 84. The closer the stop screw 96 on the range slide 94 is to the point A at one end of the range slot 90, the greater will be the ratio of movement of the outer tip of the head portion 66 of the leakport lever 64 to the movement of the transmitter lever 84.

The set point of the thermostat 20 is also preselected via the set-point dial 122 and integral screw 118 which preposition the lateral arm 112 of the transmitter lever 84 with respect to the Diastat diaphragm 54.

In the embodiment of FIGURE 2, when this embodiment is combined with the system of FIGURE 1, the submaster diaphragm 58 is responsive to variations in input pressure generated by the wall thermostat 40, whereby a modulation of the temperature controlled by the thermostat 20 above the set-point thereof may be effected, the set-point being a low limit for the system since it governs the minimum discharge temperature for the unit ventilator 22.

Thus, in the embodiment of FIGURE 2, the submaster spring 124 is adjusted to preselect the pressure at which submaster control is initiated.

For example, in the embodiments of FIGURE 2 or 3, when combined with the system of FIGURE 1, if the discharge or set-point temperature of the unit ventilator 22 is sixty (60) degrees and the set-point dial 122 is set for a temperature of sixty (60) degrees, the effect of the position of the Diastat diaphragm 54 and the adjusted position of the set-point screw 118 is such that the transmitter lever 84 is raised above the base plate 62 a sufficient distance to permit the tension spring 76 on the head portion 66 of the leakport lever 64 to cause the said leakport lever 64 to close the leakport 56.

Now, if the discharge temperature of the unit ventilator 22 should drop below the set-point, for example to fifty (50) degrees, the following will occur:

The Diastat fluid will contract in volume causing the Diastat diaphragm 54 to assume a lower position; the transmitter lever 84 via the lateral arm 112 and the set-point screw 118 will follow the Diastat diaphragm 54; the shank 68 of the leakport lever 64 will be forced downward with respect to the pivotal axis 70 thereof by means of the stop-screw 96 on the range slide 94; the head portion 66 of the leakport lever 64 will be raised thus opening the leakport 56 and causing a drop in the output or branch pressure in the output lead 38 and the operating chamber 36 of the hot water control valve 34, permitting the said valve to open and admit more hot water to the heat exchange coil 32.

Heat is thus admitted into the airflow which is detected by the bulb 24 of the Diastat causing expansion of the fluid therein, raising the Diastat diaphragm 54 and eventually causing the leakport 56 to be closed via the interaction of the transmitter lever 84 and the leakport lever 64 as described above. The branch pressure is thus increased and the hot water valve 34 is fully reclosed when the leakport 56 is completely shut, the system then being in a balanced condition.

The foregoing description of operation is the complete operation of the embodiment of FIGURE 3 combined with the system of FIGURE 1, there being no submaster control function in this embodiment.

If the temperature at the wall thermostat 40 should decrease, the submaster control of the embodiment of FIGURE 2 may be utilized to superimpose its action on the thermostat 20 in proportion to the temperature demand of the room or space in which the wall thermostat 40 is located, to thereby increase the temperature of the discharged air from the unit ventilator 22 above the set-point of the low limit thermostat 20.

Referring now to FIGURE 2, where the interaction of the Diastat diaphragm 54 and the transmitter and leakport levers 84 and 64, respectively, is identical with that of FIGURE 3, assume that more heat is needed as sensed by the wall thermostat 40 which results in decrease in the input pressure in line 42 of the thermostat 20.

This lowers the submaster diaphragm 58, whereby the button 60 thereon causes the pivot pin 104 and the lateral arm 98 of the transmitter lever 84, under the downward bias of the submaster spring 124 acting via its contact foot 126 on the point E of the said arm 98, to follow the said submaster diaphragm 58 to its lower position in response to the said temperature drop detected by the wall thermostat 40.

The lowering of the lateral arm 98 results in a lowering of the transmitter lever 84 with respect to the leakport lever 64 and the leakport 56 and branch pressure are controlled as described above to open the hot water valve to admit heat to the exchange coil 32 over and above the control effected by the Diastat and the Diastat diaphragm 54 until such time as the temperature requirements of the wall thermostat 40 are satisfied.

Referring now to FIGURES 1, 10, 11, 12, 13, and 21, the operation of this embodiment, in which no submaster modulation is present, will now be described.

Figure 11:
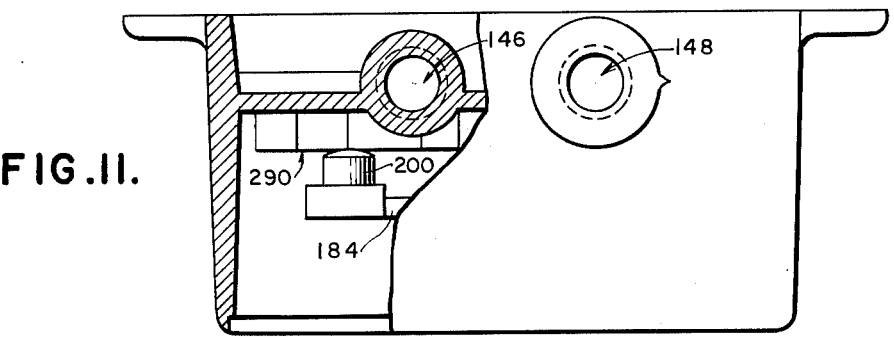
FIGURE 11 is an inverted end view of FIGURE 10 in partial cross-section.
Figure 12:
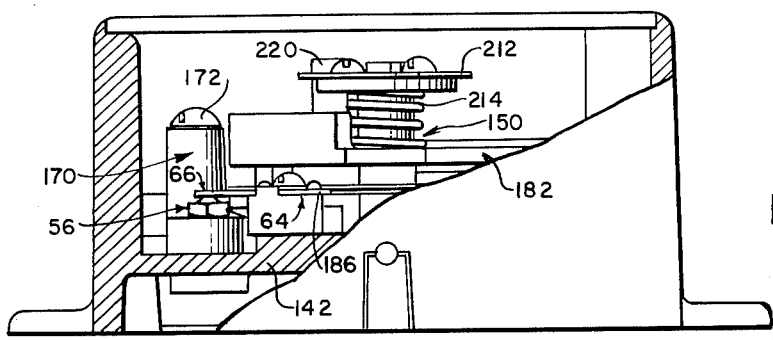
FIGURE 12 is an end view of FIGURE 10, in partial cross-section, opposite to the end view of FIGURE 11.

Signal pressure from the wall thermostat 40 is admitted to the inlet port 146 of the casing 144 via the inlet line 42 as is evident by joint reference to FIGURES 1 and 11.

As shown in FIGURE 21, the signal pressure passes through the transfer port 282 directly to the needle valve 156, the submaster chamber 178 and transfer port 284 being ineffective in this embodiment, and thence to the branch pressure chamber 286 via the transfer port 162.

If the leakport 56 is closed at this time, the branch pressure in the chamber 286 is at a maximum and is transmitted via the transfer port 288 to the outlet port 148 of the casing 144. By further reference to FIGURE 1, the outlet port 148 feeds the output line 38 of the thermostat 20 and the operating pressure in the valve actuator chamber 36 is thereby also maximized maintaining the hot water valve 34 closed. This condition assumes that the temperature sensed by the bulb 24 in the air stream of the ventilator 22 is above or equal to the set-point temperature of the thermostat 20.

Thus, if the set-point requirements are satisfied, the transmitter lever 180 is held in a raised condition via the diaphragm button 152 on the Diastat diaphragm 54 acting against the lower tip 210 of the set-point screw 206, which acts against the cross-member 184 of the said transmitter lever 180. With reference additionally to FIGURE 19, this permits the central tine 254 on bias screw 260 to maintain the head portion 66 of the leakport lever 64 in closed position against the leakport 56.

If the temperature of the airflow in the ventilator 22 should now drop below the set-point, the Diastat diaphragm 54 would lower the diaphragm button 152 and set point screw 206, and the cross-member 184 of the transmitter lever 180 would follow by pivoting on the pivot stud 188 and the universal hinge 190 under the bias of the tension spring 248. This causes the lower end 246 of the stop screw 244 on the range slide 242 to force the shank portion 68 of the leakport lever downwardly, which by virtue of the pivot means 186, acting about the hinge axis 264 (FIGURE 19), causes the head portion 66 to open the leakport 56, thereby reducing the branch pressure in the chamber 286, outlet line 32 and valve actuator chamber 36. Thus, the valve 34 is permitted to open and admit hot water to the heat exchange labyrinth 32.

This raises the temperature of the airstream in the ventilator 22 until the bulb 24 senses a sufficient change to cause the Diastat diaphragm 54 to raise the transmitter lever 180 an amount sufficient to close the leakport 56 via the leakport leaver 64. At this point, the system will be balanced.

During the entire cycle it is to be understood that the foot end 200 on the opposite end of the cross-member 184 of the transmitter lever 180 from the set-point dial 212 is held against the plate 290 on the base plate 142 by the action of the tension spring 248, whereby a second pivot is provided for the transmitter lever 180.

The throttling range and the set-point of this embodiment are set via the range slide 242 and the set-point dial 212, respectively, cooperating with their respective calibrated range slot 240 and fixed index point 218.

Referring additionally to FIGURES 4, 5, 6, 7, 8 and 9, the operation of the embodiment shown therein, which includes submaster modulation, is identical in respect to the interaction of the Diastat diaphragm 54 and set point screw 206 and the resulting effected control of the branch pressure as a function of the predetermined set-point of the thermostat 20.

When the wall thermostat 40 transmits a modulated signal pressure to the input port 146, however, this effect is transmitted to the submaster chamber 178 via the transfer port 284, whereby the submaster diaphragm 176 is displaced accordingly. If the wall thermostat transmits a demand for more heat in the form of a drop in the signal pressure, the submaster diaphragm 176 will lower itself and the foot 200 on the cross member 184 of the transmitter lever 180 by a proportional amount.

Thus, regardless of the position of the transmitter lever 180 in satisfaction of the set-point, the submaster control effectively causes a pivotal motion of the transmitter lever about an axis along legs 272 and 276 of the universal hinge 190 and the lower tip 210 of the set-point screw 206. This motion, if directed downward in response to the demand of the wall thermostat 40, causes, as described above, the head portion 66 of the leakport lever 64 to open the leakport 56 and decrease the branch pressure in the chamber 286, resulting in an opening of the hot water valve 34 to admit more hot water to the heat exachange liabyrinth 32.

When the demand of the wall thermostat 40 has been satisfied, the submaster diaphragm 176 will raise itself and the foot 200 of the cross-member 184 to a position which will effect a rebalance of the system providing the temperature of the air stream satisfies the low limit constraint placed thereon by the adjustment of the set point dial 212 in the thermostat 20.

As can be seen from the foregoing specification and drawings, this invention provides a novel, vertsatile, positive acting control system incorporating a novel pneumatic thermostat.

It is to be understood that the embodiment shown and described herein are for the purpose of example only and are not intended to limit the scope of the appended claims.

What is claimed is:
1. In a heating system for a space
including
 ventilator means for delivering heated air to said space, said ventilator
including
 a blower to provide positive airflow,
 heat exchange means in the airflow of said blower
 a source of heating fluid and
 pneumatic valve means operated by pneumatic pressure interconnecting said source, and
 said heat exchange means,
 a thermostat for controlling the flow of said heating fluid in said heat exchange means,
comprising
 a Diastat responsive to the temperature of said airflow from the ventilator;
 a transmitter lever,
 said transmitter lever having first, second and third points of suspension,
 a base plate for said respective second and third points of suspension,
 said first point of suspension being on said Diastat,
 said second point of suspension being on said base plate and
 said third point of suspension being on an adjacently spaced portion of said base plate,
 said transmitter lever being formed with a slot for throttling range control,
 a range slide in the slot on the transmitter lever,
 adjustable stop means on said slide variably engaged leakport lever,
 a source of pneumatic pressure;
 a selectively variable flow restrictor;
 a leakport;
 a branch chamber connected through said flow restrictor with said source of pneumatic pressure and vented by said leakport, and
 operatively connected with said pneumatic pressure actuated valve means;
 a leakport lever pivoted intermediate its ends and biased to close said leakport,
 said leakport lever being disposed beneath said transmitter lever and said stop means engagable with said leakport lever,
whereby
 displacement of said Diastat in response to variations in the temperature of said airflow from the ventilator is transmitted to said transmitter lever via said first point of suspension and to said leakport lever via said adjustable stop means,
 the movement of said leakport lever thus modulating the branch pressure in said branch pressure chamber as a function of the temperature of said airflow.

2. The invention defined in claim 1, wherein said leakport lever comprises a head portion, a shank portion, a pivot intermediate said portions, said head portion being positioned to engage said leakport and said shank portion being positioned to engage said stop means on said transmitter lever, and biasing means connected with said head portion to normally constrain said head portion to close said leakport.

3. The invention defined in claim 1, wherein said stop means comprises an elongated calibrated slot in said transmitter lever coextensive with a portion of said leakport lever, a slide mounted in said slot and selectively and adjustably secured therein and a stop screw threadably mounted in said slide and extending through said transmitter lever into engagement with said leakport lever, whereby the position of said slide in said slot determines the throttling range of said thermostat.

4. The invention defined in claim 1, wherein said thermostat includes a base plate and said second point of suspension of said transmitter lever comprises a dependent foot portion adapted to abut a fixed surface on said base plate and wherein said third point of suspension comprises a fixed universal pivot means.

5. The invention defined in claim 4 including adjustable biasing means acting on said transmitter lever adjacent said second point of suspension to selectively vary the force maintaining said foot portion on said fixed surface.

6. The invention defined in claim 1, wherein said thermostat includes a base plate and said third point of suspension comprises a fixed universal pivot means comprising a fixed upstanding conical pin on said base plate and a socket in said transmitter lever for freely receiving the apex of said pin.

7. The invention defined in claim 1, wherein said thermostat includes a base plate and said third point of suspension comprises a biaxial universal flexure hinge means connected with said base plate at first and second end points and connected with said transmitter lever at third and fourth end points.

8. The invention defined in claim 7, wherein said universal flexure hinge further includes first, second, third and fourth arm members extending from a common intersection to a respective one of said end points, said first and second arm members being shorter than and respectively coaxial with said third and fourth arm members; and a dependent stud extending from said transmitter lever into engagement with one side of said arm members at said common intersection, the other side of said members, at said intersection, being engaged with said base plate.

9. In a heating system for a space including ventilator means for delivering heated air to said space, said ventilator including a blower, heat exchanger means in the airflow of said blower, a source of heating fluid and pneumatic valve actuator means interconnecting said source and said heat exchange means, and said space to be heated including a pneumatic pressure wall thermostat responsive to the temperature of said space to produce a modulated pneumatic output pressure as a function thereof; a thermostat for controlling the flow of said heating fluid in said heat exchange means comprising, a Diastat responsive to the temperature of said airflow; a transmitter lever having first, second and third points of suspension, said first being on said Diastat; pneumatic input pressure controlling the modulated pneumatic output pressure of said wall thermostat; a selectively variable flow restrictor; a leakport; a branch pressure chamber connected through said flow restrictor with said source of pneumatic input pressure and vented by said leakport and operatively connected with said pneumatic valve means; a submaster control chamber connected directly with said source of input pressure and including a submaster diaphragm displaceable as a function of said pneumatic input pressure, said second point of suspension of said transmitted lever being on said submaster diaphragm; a leakport lever, pivoted intermediate its ends and biased to close said leakport, disposed beneath said transmitter lever; and stop means dependent from said transmitter lever and engageable with said leakport lever, whereby displacement of said Diastat and said submaster diaphragm in response to the respective temperature variations in said airflow and said space to be heated are transmitted to said transmitter lever via said first and second points of suspension, respectively, and to said leakport lever via said stop means, the movement of said leakport lever thus modulating the branch pressure in said branch pressure chamber as a composite function of the temperature of said airflow and the temperature of said space to be heated.

10. The invention defined in claim 9, wherein said first point of suspension of said transmitter lever comprises a set-point screw threadably mounted in said transmitter lever and having one end thereof in engagement with said Diastat, whereby the set-point of said thermostat is selectively adjustable.

11. The invention defined in claim 9, wherein said selectively variable flow restrictor comprises a needle valve including an adjustable valve needle and a valve seat therefore, said valve seat including a surface discontinuity in the form of a notch to prevent fouling of said valve by solid particles.

12. The invention defined in claim 9, wherein said leakport lever comprises a head portion, a shank portion, a pivot intermediate said portions, said head portion being positioned to engage said leakport and said shank portion being positioned to engage said stop means on said transmitter lever, and biasing means connected with said head portion to normally constrain said head portion to close said leakport.

13. The invention defined in claim 9, wherein said stop means comprises an elongated calibrated slot in said transmitter lever coextensive with a portion of said leakport lever, a slide mounted in said slot and selectively and adjustably secured therein and a stop screw threadably mounted in said slide and extending through said transmitter lever into engagement with said leakport lever, whereby the position of said slide in said slot determines the throttling range of said thermostat.

14. The invention defined in claim 9, wherein said second point of suspension of said transmitter lever comprises a dependent foot portion adapted to abut the surface of said submaster diaphragm.

15. The invention defined in claim 14, wherein said thermostat further includes a range spring acting at one end on said foot portion to force same against said submaster diaphragm, a stop screw adjustably coextensive with a portion of said range spring and engageable with said foot portion to limit the maximum movement thereof in response to displacement of said submaster diaphragm, and a range nut acting against the other end of said range spring and threadably mounted on said stop screw, whereby the upper and lower limits of the submaster control range of the said thermostat are selectively adjustable.

16. The invention defined in claim 9, wherein said third point of suspension of said transmitter lever comprises a fixed universal pivot means.

17. The invention defined in claim 9, wherein said thermostat includes a base plate and said third point of suspension comprises a fixed universal pivot means comprising a fixed upstanding conical pin on said base plate and a socket in said transmitter lever for freely receiving the apex of said pin.

18. The invention defined in claim 9, wherein said thermostat includes a base plate and said third point of suspension comprises a biaxial universal flexure hinge means connected with said base plate at first and second end points and connected with said transmitter lever at third and fourth end points.

19. The invention defined in claim 18, wherein said universal flexure hinge further includes first, second, third and fourth arm members extending from a common intersection to a respective one of said end points, said first and second arm members being shorter than and respectively coaxial with said third and fourth arm members; and a dependent stud extending from said transmitter lever into engagement with one side of said arm members at said common intersection, the other side of said members, at said intersection, being engaged with said base plate.

References Cited by the Examiner

UNITED STATES PATENTS

| | | | |
|---|---|---|---|
| 1,928,737 | 10/1933 | Otto | 236—37 |
| 1,941,314 | 12/1933 | Otto | 236—37 |
| 1,941,315 | 12/1933 | Ward | 236—37 |
| 2,154,108 | 4/1939 | Olson | 236—99 |
| 2,354,814 | 8/1944 | Joesting. | |
| 2,363,595 | 11/1944 | Joesting | 236—87 |

EDWARD J. MICHAEL, *Primary Examiner.*

UNITED STATES PATENT OFFICE
CERTIFICATE OF CORRECTION

Patent No. 3,259,315　　　　　　　　　　　　　　　　　　July 5, 1966

Robert A. Gray et al.

It is hereby certified that error appears in the above numbered patent requiring correction and that the said Letters Patent should read as corrected below.

Column 2, line 44, column 3, lines 40 and 46, column 4, lines 10, 17 and 64, column 5, line 46, column 7, lines 52 and 70, column 8, lines 4, 5, 7, 18, 19, 39, and 57, and column 9, lines 9, 17, 34, and 51, for "Diastat", each occurrence, read -- thermostat --; column 10, lines 31 and 62, column 11, lines 58 and 60, and column 12, lines 2 and 16, for "Diastat", each occurrence, read -- displaceable means --.

Signed and sealed this 5th day of September 1967.

(SEAL)
Attest:

ERNEST W. SWIDER　　　　　　　　　　　　　　　　　EDWARD J. BRENNER
Attesting Officer　　　　　　　　　　　　　　　　　　Commissioner of Patents